(12) United States Patent
Meadows

(10) Patent No.: US 7,454,392 B2
(45) Date of Patent: Nov. 18, 2008

(54) METHOD FOR OBTAINING A VALUE VIA A RULE ENGINE IMPLEMENTED BY A COLLECTION OBJECT

(75) Inventor: Chad Lee Meadows, Raleigh, NC (US)

(73) Assignee: International Business Machines Corporation, Armonk, NY (US)

(*) Notice: Subject to any disclaimer, the term of this patent is extended or adjusted under 35 U.S.C. 154(b) by 360 days.

(21) Appl. No.: 11/329,687

(22) Filed: Jan. 10, 2006

(65) Prior Publication Data

US 2007/0174263 A1 Jul. 26, 2007

(51) Int. Cl.
*G06N 5/00* (2006.01)
(52) U.S. Cl. ............... 706/45; 706/47; 707/103 R
(58) Field of Classification Search ................ 706/45, 706/47; 707/103 R
See application file for complete search history.

(56) References Cited

U.S. PATENT DOCUMENTS 6,772,172 B2 * 8/2004 Leong et al. ............ 707/103 R

* cited by examiner

*Primary Examiner*—Wilbert L Starks, Jr.
(74) *Attorney, Agent, or Firm*—Schmeiser, Olsen & Watts; John R. Pivinichny

(57) ABSTRACT

A method for obtaining a value via a rule engine implemented by a collection object associated with an object-oriented application. A request for the value includes a key, is received from the application, and is directed to a method of the collection object. The collection object is capable of storing the key and associated data, and providing the data in response to receiving the request. An overriding of the method of the collection object replaces the provision of the data by the collection object with a processing of the request by a rule engine external to the application. The rule is identified in a rule definition file external to the application based on an association between the rule and the key. An algorithm associated with the rule and included in the rule definition file is executed to provide the requested value.

10 Claims, 3 Drawing Sheets

METHOD FOR OBTAINING A VALUE VIA A RULE ENGINE IMPLEMENTED BY A COLLECTION OBJECT

BACKGROUND OF THE INVENTION

1. Technical Field

The present invention relates to a technique for obtaining a value via a rule engine, and more particularly to a technique for obtaining a value via an external rule engine implemented by a collection object in an object-oriented application.

2. Related Art

Conventionally, an object-oriented application that utilizes rules to obtain values includes rule definitions within the code of the application and/or is customized to interact with a specific external rule engine. The inclusion of rule definitions within the code and the customization of the application to work with the particular rule engine create obstacles for maintaining the application and updating the rule definitions. Thus, there is a need for an improved technique for obtaining a value by utilizing a rule engine in an object-oriented application.

SUMMARY OF THE INVENTION

In first embodiments, the present invention provides a method of obtaining a value via a rule engine implemented by a collection object in an object-oriented application, the method comprising:

receiving a request for a value from an object-oriented application, the request including a key and being directed to a method of a collection object associated with the object-oriented application, wherein the collection object is capable of storing the key, storing data associated with the key, and providing the data in response to the receiving the request;

responsive to the receiving, processing the request by a rule engine external to the object-oriented application, the processing replacing the providing the data by the collection object via the method of the collection object being overridden to invoke the rule engine;

identifying, via the processing the request, a rule included in a rule definition file external to the application, the identifying based on the rule being associated with the key included in the request, the rule definition file including an algorithm associated with the rule; and executing the algorithm via the processing the request, the executing providing the value.

In second embodiments, the present invention provides a system for obtaining a value via a rule engine implemented by a collection object in an object-oriented application, the system comprising:

means for receiving a request for a value from an object-oriented application, the request including a key and being directed to a method of a collection object associated with the object-oriented application, wherein the collection object is capable of storing the key, storing data associated with the key, and providing the data in response to the receiving the request;

means for processing, responsive to the receiving, the request by a rule engine external to the object-oriented application, the processing replacing the providing the data by the collection object via the method of the collection object being overridden to invoke the rule engine;

means for identifying, via the processing the request, a rule included in a rule definition file external to the application, the identifying based on the rule being associated with the key included in the request, the rule definition file including an algorithm associated with the rule; and means for executing the algorithm via the processing the request, the executing providing the value.

In third embodiments, the present invention provides a computer program product comprising a computer-usable medium including computer-usable program code for obtaining a value via a rule engine implemented by a collection object in an object-oriented application, the computer program product including:

computer-usable code for receiving a request for a value from an object-oriented application, the request including a key and being directed to a method of a collection object associated with the object-oriented application, wherein the collection object is capable of storing the key, storing data associated with the key, and providing the data in response to the receiving the request;

computer-usable code for processing, responsive to the receiving, the request by a rule engine external to the object-oriented application, the processing replacing the providing the data by the collection object via the method of the collection object being overridden to invoke the rule engine;

computer-usable code for identifying, via the processing the request, a rule included in a rule definition file external to the application, the identifying based on the rule being associated with the key included in the request, the rule definition file including an algorithm associated with the rule; and computer-usable code for executing the algorithm via the processing the request, the executing providing the value.

In fourth embodiments, the present invention provides a method for deploying computing infrastructure, comprising integrating computer-readable code into a computing system, wherein the code in combination with the computing system is capable of performing a process of obtaining a value via a rule engine implemented by a collection object in an object-oriented application, the process comprising:

receiving a request for a value from an object-oriented application, the request including a key and being directed to a method of a collection object associated with the object-oriented application, wherein the collection object is capable of storing the key, storing data associated with the key, and providing the data in response to the receiving the request;

responsive to the receiving, processing the request by a rule engine external to the object-oriented application, the processing replacing the providing the data by the collection object via the method of the collection object being overridden to invoke the rule engine;

identifying, via the processing the request, a rule included in a rule definition file external to the application, the identifying based on the rule being associated with the key included in the request, the rule definition file including an algorithm associated with the rule; and executing the algorithm via the processing the request, the executing providing the value.

Advantageously, the present invention externalizes business rules relative to an object-oriented application, making it easier for the business rules to be updated without modifying the code of the application. Further, the application leverages an existing interface (i.e., a collection object) to seamlessly implement an external rule engine without the application being aware of the rule engine. The application does not need to be designed with customized coding to interact with the rule engine, and no proprietary interface is required between the application and the rule engine.

DETAILED DESCRIPTION OF THE INVENTION

Figure 1:
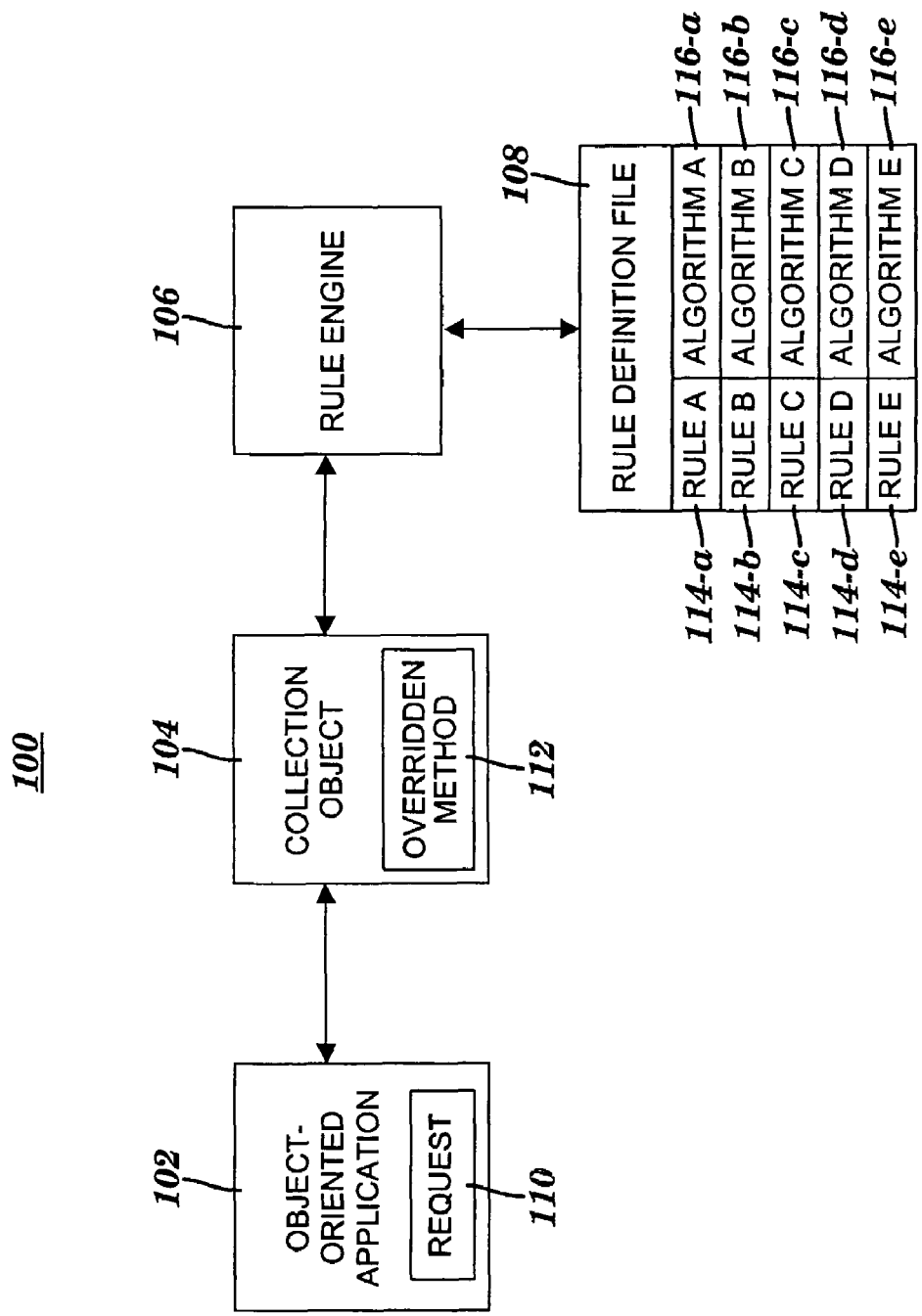
FIG. 1 is a block diagram of a system for obtaining a value via a rule engine implemented by a collection object in an object-oriented application, in accordance with embodiments of the present invention.

FIG. 1 is a block diagram of a system for obtaining a value via a rule engine implemented by a collection object in an object-oriented application, in accordance with embodiments of the present invention. System 100 includes an object-oriented application 102 (e.g., a Java® application), a collection object 104 internal to application 102, a software rule engine 106 external to application 106, and a rule definition file 108 external to application 102. As used herein, a rule engine is defined to be a software component that evaluates one or more rule expressions. A rule engine evaluation of a rule processes an algorithm that includes one or more procedural steps. For example, a rule engine evaluating a rule that calculates taxes for a business application order processes an algorithm that includes steps of calculating local, state, and federal taxes, calculating shipping tax, etc. Rule engine 106 can be implemented by, for instance, Drools, which is a forward-chaining rule engine available from The Werken Company of Atlanta, Ga.

Object-oriented application 102 includes a request 110 that requests retrieval of a value. Request 110 includes a key name (a.k.a. key, which is not shown in FIG. 1). Collection object 104 includes a method 112 that is overridden so that request 110 is processed by rule engine 106, as described below relative to FIG. 2. Collection object 104 is, for example, a Java® map interface that is capable of storing (key, value) pairs (e.g., a hashmap). Rule engine 106 evaluates algorithms in rule definition file 108, which includes rules 114-a, b, c, d and e and algorithms 116-a, b, c, d and e. Rules 114-a through 114-e are associated with algorithms 116-a through 116-e in a one-to-one correspondence.

Request 110 invokes a method of collection object 104 (e.g., a Java® Get method) to request that collection object 104 retrieve the stored value associated with the key included in the request. The present invention overrides the value retrieval mechanism of the collection object, and instead provides retrieval of a value via rule engine 106 and rule definition file 108. One of the rules 114 is selected by the key of request 110, and the algorithm 116 associated with the selected rule is processed by rule engine 106 to provide the requested value. The details of this value retrieval are described below relative to FIG. 2.

Figure 2:
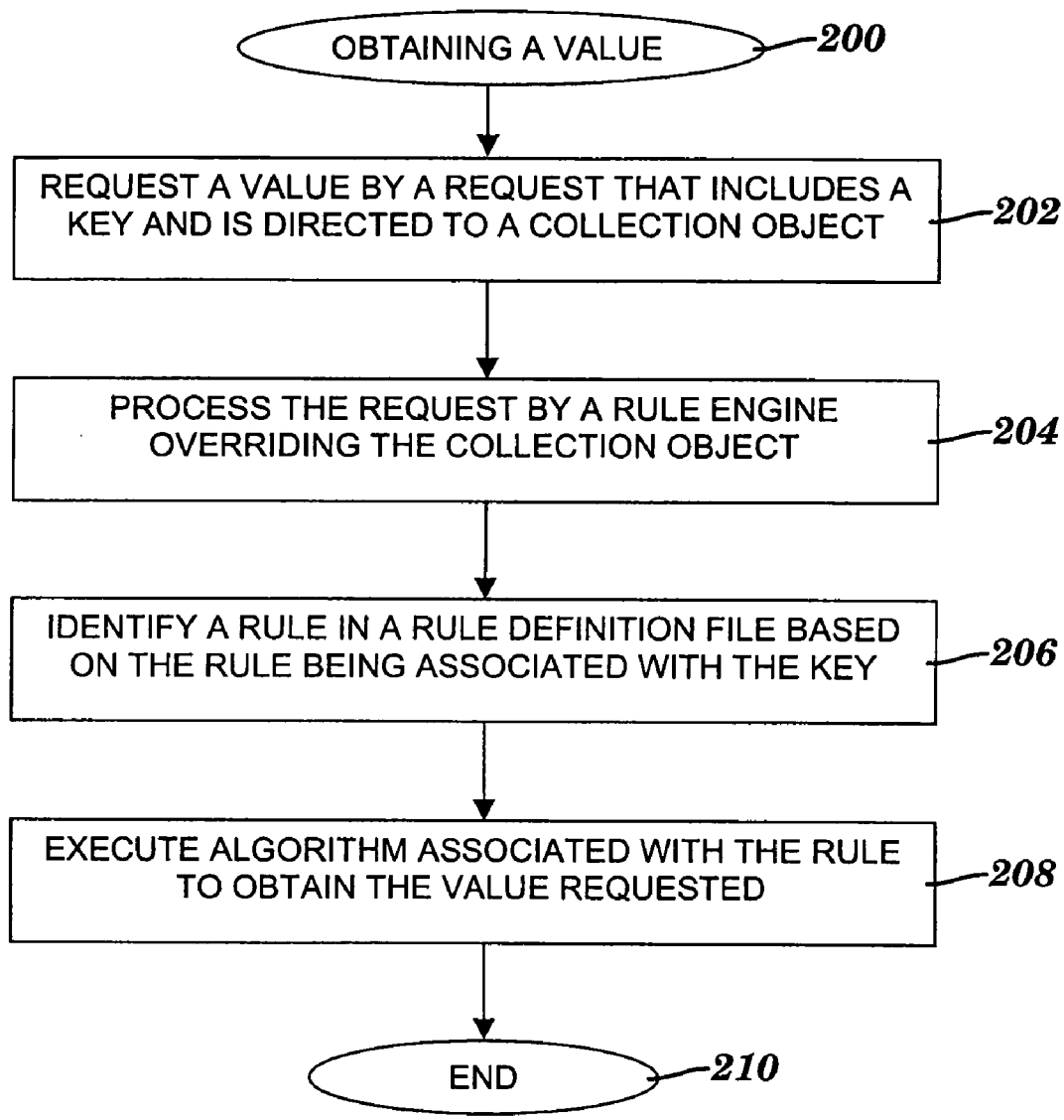
FIG. 2 is a flow chart of a process for obtaining a value via the rule engine of FIG. 1, in accordance with embodiments of the present invention.

FIG. 2 is a flow chart of a process for obtaining a value via the rule engine of FIG. 1, in accordance with embodiments of the present invention. The process for obtaining a value begins at step 200. In step 202, a value is requested by request 110 (see FIG. 1) within object-oriented application 102 (see FIG. 1). The request includes a key (i.e., a string of alphanumeric characters) and invokes method 112 (see FIG. 1) of collection object 104 (see FIG. 1) for retrieval of the value requested. Method 112 (see FIG. 1) is a pre-existing method built into collection object 104 (see FIG. 1).

The request of step 202 is included, for example, in a Java® Application Programming Interface (API). The following code is one example of a Java® API implementing step 202, and requests a ship-to location. The request includes the key of "ship-to" and is requesting the value (i.e., ship-to location) associated with the key. The request is directed to the Java® map interface, but the value returned will be based on an execution of an algorithm associated with a rule defined in an external rule definition file (e.g., XML file), as described below.

```
Map ruleMap = (Map) ruleXML.getMap( );
String shippingLocation = ruleMap.get("ship-to");
```

Although collection object 104 (see FIG. 1) is capable of storing the key included in the request along with associated data, and is capable of providing the stored data in response to a request that includes the key, the request of step 202 is instead processed by rule engine 106 (see FIG. 1) in step 204. That is, code residing in collection object 104 (see FIG. 1) overrides method 112 (see FIG. 1) to invoke rule engine 106 (see FIG. 1) to process request 110 (see FIG. 1). The overriding of method 112 (see FIG. 1) is a capability of the object-oriented environment in which object-oriented application 102 is executed and collection object 104 is invoked. For example, a Java® environment provides a built-in feature that allows a method to be overridden.

The aforementioned overriding of the method allows application 102 (see FIG. 1) to include code (e.g., the request of step 202) designed to interact with a standard, built-in interface (e.g., the Java® map) internal to application 102 (see FIG. 1), and which actually interacts with rule engine 106 (see FIG. 1) that is external to application 102 (see FIG. 1). In this way, the Java® map acts like a façade that places the operation of rule engine 106 (see FIG. 1) behind-the-scenes. Further, the processing of the request of step 202 is performed without requiring a proprietary interface between application 102 (see FIG. 1) and rule engine 106 (see FIG. 1) and without requiring that the code of application 102 (see FIG. 1) be customized to interact with rule engine 106 (see FIG. 1).

An example of Java® code that resides in collection object 104 and overrides the get method of the Java® map interface to invoke the rule engine of step 204 is shown below.

```
public synchronized Object get(Object id) {
    Object object = null;
    object = ruleEngineAdapter.get(id) ;
    return (object);
}
```

In step 206, the processing of the request in step 204 identifies a rule in rule definition file 108 (see FIG. 1), which is external to object-oriented application 102 (see FIG. 1). The identification of the rule is based on the rule being associated with the key included in the request of step 202. Rule definition file 108 (see FIG. 1) includes one or more rules 114 (see FIG. 1) and one or more algorithms 116 (see FIG. 1) in a one-to-one correspondence. The algorithms are interpreted and processed by rule engine 106 (see FIG. 1). In one embodiment, the interpretation and processing of an algorithm by the rule engine includes evaluating a plurality of procedural steps.

One example of rule definition file 108 (see FIG. 1) is an XML file, such as the one shown below.

```xml
<action name="ship-to" value="New York">
    <condition if="${today == 'Monday'}"/>
</action>
<action name="ship-to" value="Boston"/>
```

In step 208, an algorithm included in rule definition file 108 (see FIG. 1), which associates the algorithm with the rule identified in step 206, is interpreted and processed by rule engine 106 (see FIG. 1). The processing of the algorithm in step 208 executes the algorithm, which provides the value requested in step 202. For instance, the XML rule definition file shown above determines a ship-to location based on the execution of an algorithm that includes the evaluation of a condition related to the value of "today." If rule engine 106 (see FIG. 1) determines that the value of "today" in the XML file is "Monday," then the rule engine returns a ship-to value of "New York." For any other day of the week, the rule engine returns a default ship-to value of "Boston."

Unlike the conventional static (key, value) pairs provided by a Java® map interface, rule definition file 108 (see FIG. 1) includes algorithms that are executed by rule engine 106 (see FIG. 1) to provide values. The algorithms included in rule definition file 108 (see FIG. 1) are not static. An algorithm in rule definition file 108 (see FIG. 1) can be dynamically updated, and the process of FIG. 2 can be applied to the updated algorithm to provide a value from the execution of the algorithm without requiring any change to application 102 (see FIG. 1). For example, a request identical to the one used in step 202 can be utilized to obtain another value based on the execution of the updated algorithm.

In an alternate embodiment, rule definition file 108 includes one or more algorithms that can be dynamically changed, and one or more pre-defined, static values. The static values are associated with rules included in the rule definition file in a one-to-one correspondence. When a key associated with a static value is included in request 110 (see FIG. 1), the static value is returned without any evaluation being required.

Figure 3:
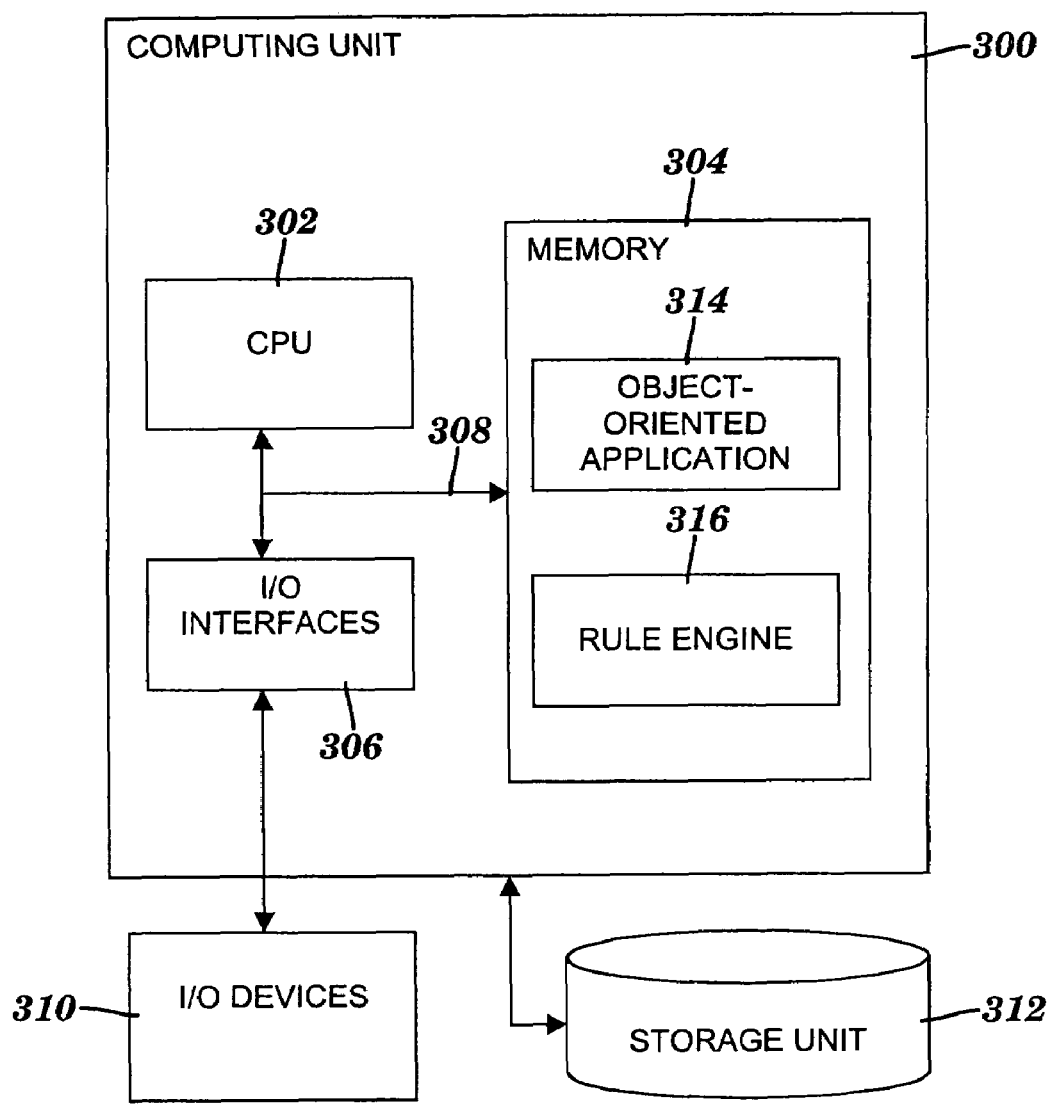
FIG. 3 is a block diagram of a computing system for implementing the process of FIG. 2, in accordance with embodiments of the present invention.

FIG. 3 is a block diagram of a computing system for implementing the process of FIG. 2, in accordance with embodiments of the present invention. Computing unit 300 generally comprises a central processing unit (CPU) 302, a memory 304, an input/output (I/O) interface 306, a bus 308, I/O devices 310 and a storage unit 312. CPU 302 performs computation and control functions of computing unit 300. CPU 302 may comprise a single processing unit, or be distributed across one or more processing units in one or more locations (e.g., on a client and a server). Memory 304 may comprise any known type of data storage and/or transmission media, including magnetic media, optical media, random access memory (RAM), read-only memory (ROM), a data cache, a data object, etc. Similar to CPU 302, memory 304 may reside at a single physical location, comprising one or more types of data storage, or be distributed across a plurality of physical systems in various forms. Further, memory 304 can include data distributed across, for example, a local area network (LAN), wide area network (WAN) or storage area network (SAN) (not shown). Storage unit 312 is, for example, a magnetic disk drive or an optical disk drive that stores rule definition file 108 (see FIG. 1).

I/O interface 306 comprises any system for exchanging information to or from an external source. I/O devices 310 comprise any known type of external device, including a display monitor, keyboard, pointing device, printer, speakers, handheld device, printer, facsimile, etc. Bus 308 provides a communication link between each of the components in computing unit 300, and may comprise any type of transmission link, including electrical, optical, wireless, etc.

I/O interface 306 also allows computing unit 300 to store and retrieve information (e.g., program instructions or data) from an auxiliary storage device, such as a non-volatile storage device (e.g., a CD-ROM drive which receives a CD-ROM disk) (not shown). Computing unit 300 can store and retrieve information from other auxiliary storage devices (not shown), which can include a direct access storage device (DASD) (e.g., hard disk or floppy diskette), a magneto-optical disk drive, a tape drive, or a wireless communication device.

Computing unit 300 is, for instance, a personal computer, laptop computer, handheld device, mobile phone, etc.

Memory 304 includes computer program code comprising an object-oriented application 314 that runs, for example, on the Java® 2 Platform, and a rule engine 316 that interprets and processes algorithms included in rule definition file 108 (see FIG. 1). Further, memory 304 may include other systems not shown in FIG. 3, such as an operating system (e.g., Linux) that runs on CPU 302 and provides control of various components within and/or connected to computing unit 300.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code 314, 316 (see FIG. 3) for use by or in connection with a computer 300 (see FIG. 3) or any instruction execution system to provide and facilitate the capabilities of the present invention. For the purposes of this description, a computer-usable or computer-readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, RAM 304 (see FIG. 3), ROM, a rigid magnetic disk and an optical disk. Current examples of optical disks include compact disk-read-only memory (CD-ROM), compact disk-read/write (CD-R/W) and DVD.

A data processing system 300 (see FIG. 3) suitable for storing and/or executing program code 314, 316 (see FIG. 3) will include at least one processor 302 (see FIG. 3) coupled directly or indirectly to memory elements 304 (see FIG. 3) through a system bus 308 (see FIG. 3). The memory elements can include local memory employed during actual execution of the program code, bulk storage, and cache memories which provide temporary storage of at least some program code in order to reduce the number of times code must be retrieved from bulk storage during execution.

Network adapters may also be coupled to system 300 (see FIG. 3) to enable the data processing system to become coupled to other data processing systems or remote printers or storage devices through intervening private or public networks. Modems, cable modems and Ethernet cards are just a few of the currently available types of network adapters.

Furthermore, the present invention discloses a method for deploying or integrating computing infrastructure, comprising integrating computer-readable code into computer system 300 (see FIG. 3), wherein the code in combination with computer system 300 (see FIG. 3) is capable of performing a process of obtaining a value via a rule engine implemented by a collection object. The disclosed method for deploying or integrating computing infrastructure with the capabilities described herein can be offered as a service on a subscription service.

The flow diagrams depicted herein are provided by way of example. There may be variations to these diagrams or the steps (or operations) described herein without departing from the spirit of the invention. For instance, in certain cases, the steps may be performed in differing order, or steps may be added, deleted or modified. All of these variations are considered a part of the present invention as recited in the appended claims.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method of operating a computer processing unit by obtaining a value via a rule engine implemented by a JAVA MAP in an object-oriented application, said method comprising:

receiving a request for a value from an object-oriented application operating on a computer processing unit, said request including a key and being directed to a Java Get object associated with said object-oriented application, wherein said JAVA MAP is capable of storing said key, storing data associated with said key, and providing said data in response to said receiving said request;

responsive to said receiving, processing said request by a rule engine external to said object-oriented application, said processing replacing said providing said data by said JAVA MAP via said Java Get object being overridden to invoke said rule engine;

identifying, via said processing said request, a rule included in a rule definition file external to said application, said identifying based on said rule being associated with said key included in said request, said rule definition file including an algorithm associated with said rule; and executing said algorithm on a computer processing unit via said processing said request, said executing resulting in the output of said value from storage in a computer processing unit.

2. The method of claim 1, further comprising:
updating said rule definition file to provide an updated version of said algorithm; and
executing said updated version of said algorithm in response to receiving another request identical to said request,
wherein said executing said updated version provides another value different from said value, and
wherein said application is not modified.

3. The method of claim 1, wherein said processing said request is performed via an interface between said application and said rule engine, said interface being said JAVA MAP, and wherein said processing said request is further performed without a proprietary interface between said application and said rule engine, and without code of said application customized to interact with said rule engine.

4. The method of claim 1, wherein said rule definition file includes said rule and a set of other rules, wherein a first subset of said set includes one or more rules associated, in a one-to-one correspondence, with one or more pre-defined, static values included in said rule definition file, and a second subset of said set includes one or more rules associated, in a one-to-one correspondence, with one or more algorithms included in said rule definition file.

5. The method of claim 1, wherein said rule definition file is an XML file.

6. The method of claim 1, wherein said object-oriented application is a Java application.

7. A method for deploying a computing infrastructure, comprising integrating computer-readable code into a computing system, wherein the code in combination with the computing system is capable of performing a process of obtaining a value via a rule engine implemented by a JAVA MAP in an object-oriented application in a computer processing unit, the process comprising:

receiving a request for a value from an object-oriented application, said request including a key and being directed to a Java Get object associated with said object-oriented application, wherein said JAVA MAP is capable of storing said key, storing data associated with said key, and providing said data in response to said receiving said request;

responsive to said receiving, processing said request by a rule engine external to said object-oriented application, said processing replacing said providing said data by said JAVA MAP via said Java Get object being overridden to invoke said rule engine;

identifying, via said processing said request, a rule included in a rule definition file external to said application, said identifying based on said rule being associated with said key included in said request, said rule definition file including an algorithm associated with said rule; and executing said algorithm via said processing said request, said executing resulting in the output of said value from the storage of a computer processing unit.

8. The method of claim 7, wherein said process further comprises:
updating said rule definition file to provide an updated version of said algorithm; and
executing said updated version of said algorithm in response to receiving another request identical to said request,
wherein said executing said updated version provides another value different from said value, and
wherein said application is not modified.

9. The method of claim 7, wherein said processing said request is performed via an interface between said application and said rule engine, said interface being said JAVA MAP, and wherein said processing said request is further performed without a proprietary interface between said application and said rule engine, and without code of said application customized to interact with said rule engine.

10. The method of claim 7, wherein said rule definition file includes said rule and a set of other rules, wherein a first subset of said set includes one or more rules associated, in a one-to-one correspondence, with one or more pre-defined, static values included in said rule definition file, and a second subset of said set includes one or more rules associated, in a one-to-one correspondence, with one or more algorithms included in said rule definition file.

* * * * *